(12) United States Patent
Dimovski et al.

(10) Patent No.: US 10,625,628 B2
(45) Date of Patent: Apr. 21, 2020

(54) MODULAR VEHICLE SEATING INSERT, MODULAR SEATING SYSTEM AND MODULAR SEATING METHOD

(71) Applicant: Adient Engineering and IP GmbH, Burscheid (DE)

(72) Inventors: Dalibor Dimovski, Macomb, MI (US); John Gomez, Howell, MI (US); James Biebel, Milford, MI (US); Jolene Ng, Ann Arbor, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 169 days.

(21) Appl. No.: 15/938,582

(22) Filed: Mar. 28, 2018

(65) Prior Publication Data

US 2019/0299813 A1    Oct. 3, 2019

(51) Int. Cl.
| | | |
|---|---|---|
| *B60N 2/01* | (2006.01) | |
| *B60N 2/015* | (2006.01) | |
| *B60N 3/02* | (2006.01) | |
| *B60R 7/04* | (2006.01) | |
| *B60R 16/02* | (2006.01) | |
| *B60R 22/195* | (2006.01) | |
| *B60R 22/26* | (2006.01) | |

(Continued)

(52) U.S. Cl.
CPC ......... *B60N 2/01516* (2013.01); *B60N 2/242* (2013.01); *B60N 2/686* (2013.01); *B60N 3/02* (2013.01); *B60R 7/043* (2013.01); *B60R 16/0215* (2013.01); *B60R 22/1951* (2013.01); *B60R 22/26* (2013.01)

(58) Field of Classification Search
CPC .... B60N 2/01516; B60N 2/242; B60N 2/686; B60N 3/02; B60R 7/043; B60R 16/0215; B60R 22/1951; B60R 22/26

USPC .......................................................... 296/63
See application file for complete search history.

(56) References Cited

U.S. PATENT DOCUMENTS

| | | | |
|---|---|---|---|
| 3,632,157 A | * | 1/1972 | Lohr ...................... B60N 2/012 296/191 |
| 3,873,155 A | | 3/1975 | Barecki |

(Continued)

OTHER PUBLICATIONS

European Patent Office, European Search Report issue in Application EP19164549.8, dated Oct. 8, 2019, 8 pages, European Patent Office, Munich, Germany.

*Primary Examiner* — Joseph D. Pape
(74) *Attorney, Agent, or Firm* — Marshall & Melhorn, LLC

(57) ABSTRACT

A modular vehicle seating system includes a vehicle body (70, 72) with vehicle interior connection features (60, 62, 64) and a modular vehicle seating insert. The seating insert comprises a shell structure (10. 10', 10") to be received within the vehicle body. The shell structure has a vehicle body facing surface and a vehicle interior facing surface, wherein the vehicle interior facing surface defines seat module receiving portions (12, 14). Vehicle connection features (80, 82, 84) are operatively provided at a side of the vehicle body facing surface of the shell structure for cooperation with the vehicle interior connection features to fix the shell structure to the vehicle body. Seat module connection features (40) are associated with each of the seat module receiving portions. The system further includes one or more seat module (90), each with a seat base (94) and a seat clamping connector (91, 92, 92).

19 Claims, 5 Drawing Sheets

(51) Int. Cl.
*B60N 2/68* (2006.01)
*B60N 2/24* (2006.01)

(56) References Cited

U.S. PATENT DOCUMENTS 5,152,582 A    10/1992  Magnuson
7,717,499 B2 *  5/2010  Fioravanti .............. B60N 2/012
                                              296/193.05

* cited by examiner

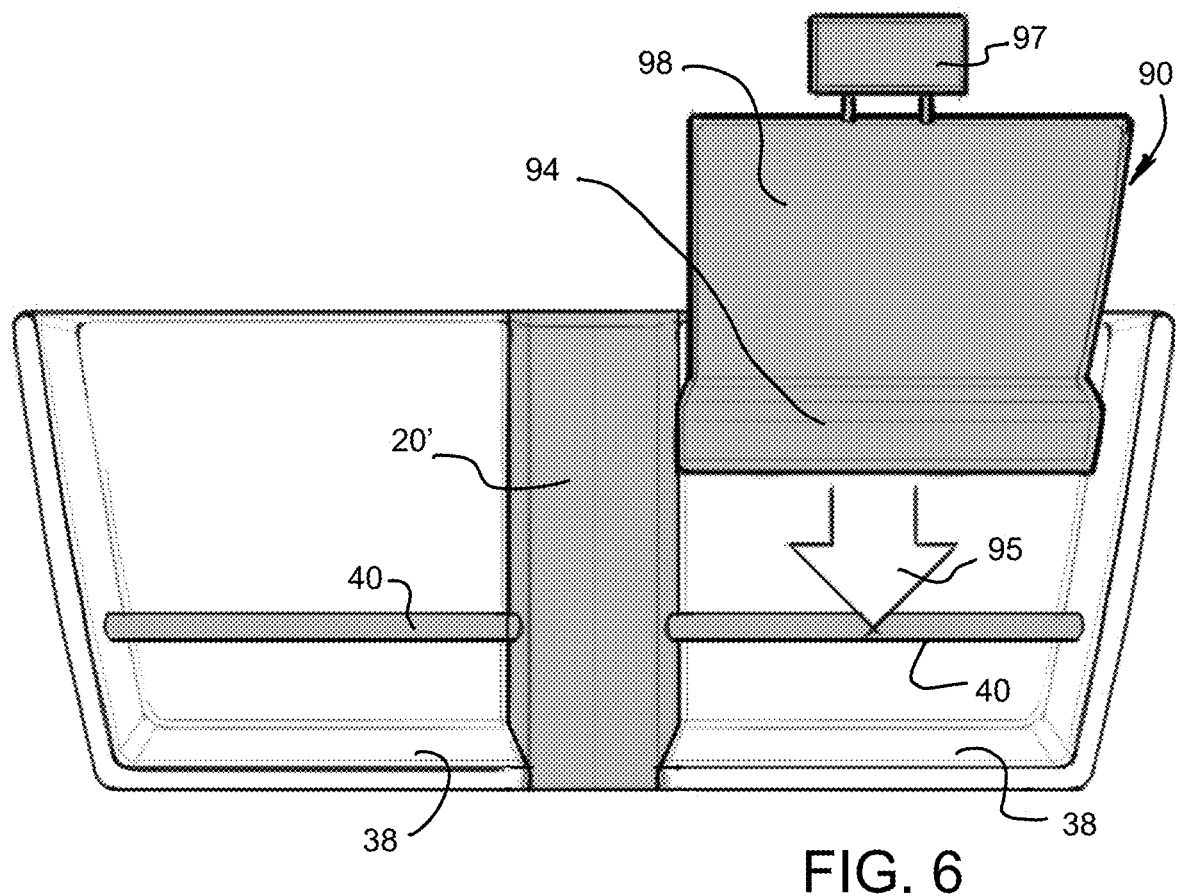
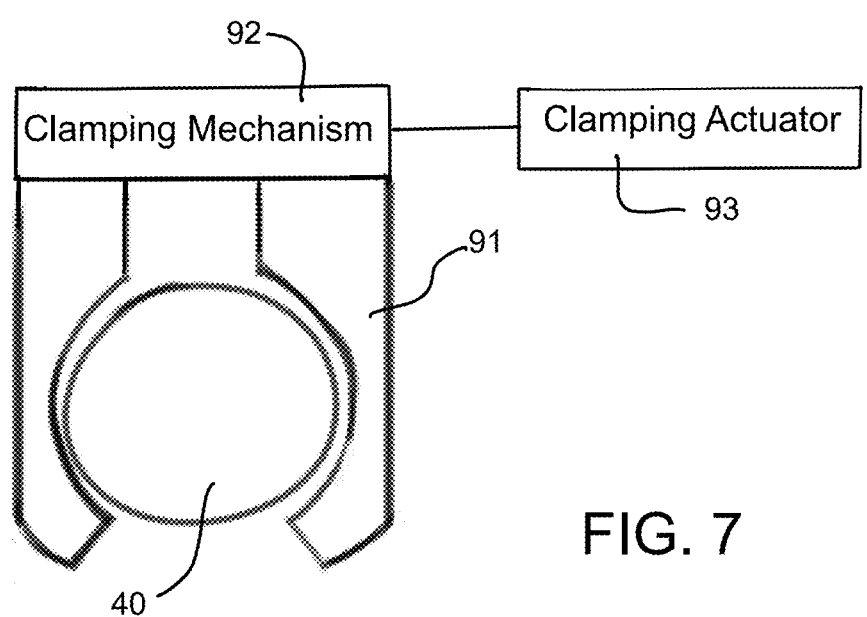

MODULAR VEHICLE SEATING INSERT, MODULAR SEATING SYSTEM AND MODULAR SEATING METHOD

FIELD OF THE INVENTION

The present invention relates to vehicle seating in general and more particularly relates to a modular vehicle seat configuration and a modular vehicle seat arrangement as well as a method of providing a vehicle seat arrangement.

BACKGROUND OF THE INVENTION

Vehicle seats have been provided as individual units which are inserted into a vehicle body and fixed inside the body. Typically, vehicle seats are designed for particular vehicle models. The vehicle is dimensioned or sized in advance and the vehicle seat is adapted to the design. This presents limitations with regard to changing seating configurations for a vehicle and particularly limits scalability and the ability to provide multiple seating configurations across vehicles of various sizes and types. Changes as to vehicle seats may be extensively limited based on the vehicle type and size. Vehicle seats that are designed for one vehicle type or vehicle size typically are not immediately usable in a different vehicle type or vehicle size.

SUMMARY OF THE INVENTION

It is an object of the invention to provide a vehicle seat system which avoids problems with regard to scalability and providing multiple seating configurations across vehicles of many sizes.

It is a further object of the invention to provide a vehicle seating insert which is adapted to one or more particular vehicles and can receive seating modules of multiple seating types and configurations.

It is a further object of the invention to provide a method for configuring, arranging and/or installing seating in a vehicle, which method simplifies the serviceability and installation of seating modules and provides for scalability allowing multiple seating configurations across vehicles of many types and sizes.

According to the invention, a modular vehicle seating insert is provided comprising a shell structure to be received within a vehicle body. The shell insert structure has a vehicle body facing surface and a vehicle interior facing surface. The vehicle interior facing surface defines seat module receiving portions. Vehicle connection features operatively provided at a side of the vehicle body facing surface of the shell structure for cooperation with vehicle body connection features to fix the shell structure to the vehicle body. The shell insert structure includes seat module connection features. Each of the seat module connection features is associated with one of the seat module receiving portions.

The vehicle connection features each advantageously comprise a clamping connector for clamping connection with a connection point bar supported by the vehicle body.

The shell may support a handle grip, extending outwardly from the shell structure and positioned at a side of each of the seat module receiving portions. The handle grip and other features may be molded into the shell structure, at the time of forming the shell structure.

A seat belt retractor assembly may be fixed to the shell or a seat belt anchor may be fixed to the shell. Further, both a seat belt retractor assembly may be fixed to the shell and a seat belt anchor may be fixed to the shell.

The shell may define a central portion separating the seat module receiving portions. The seat module connection features may each comprise a connection point bar extending from a shell sidewall to the central portion.

The shell may comprises one or more passages. The passages may comprise an access passage between a vehicle a shell body facing surface side and a shell vehicle interior facing surface side. The passages map provide one or more distribution paths along an extent of the shell. The passages may comprise one or more access passages between a vehicle body facing surface side and a vehicle interior facing surface side and providing a distribution path along an extent of the shell. Power attachments may be provided comprising a connector end disposed adjacent to or extending out of the access passage and wires extending through the distribution path. The insert shell may further comprises a storage space defined by a portion of the vehicle body facing surface.

According to another aspect of the invention, a modular vehicle seating system is provided comprising a vehicle body with vehicle interior connection features and a modular vehicle seating insert according to the invention.

The vehicle connection features each comprise a vehicle clamping connector for clamping connection with a vehicle connection point bar supported by the vehicle body. The vehicle interior connection features comprise vehicle support points each supporting a vehicle connection point bar. The vehicle clamping connector clampingly connects with the vehicle connection point bar to fix the shell to the vehicle body.

The modular vehicle seating system advantageously further comprises a seat module comprising a seat base and a seat clamping connector. The seat module connection features each comprise a connection point bar supported by the shell and provided at each of the seat module receiving portions. The seat clamping connector clampingly connects with the connection point bar to fix the seat module at one of the seat module receiving portions.

The modular vehicle seating system may advantageously include transmission path attachments with a connector end disposed adjacent to or extending out of the access passage and wires extending through the distribution path. The shell may have an insert component receiving space defined by a portion of the vehicle body facing surface. An insert component may be connected to vehicle power and vehicle system features via the connector and wires. The insert component may be one or more of a credit/debit card reader, an ac power connection, an inductive power charge facility, a data connector, a wireless data transceiver, a video display, an optical reader, a fold out tray device, a mobile device support and similar useful features.

According to still a further aspect of the invention, a modular vehicle seating method is provided. The method includes providing a vehicle body with vehicle interior connection features and also providing a modular vehicle seating insert shell. The insert shell includes a shell structure to be received within a vehicle body. The shell structure has a vehicle body facing surface and a vehicle interior facing surface. The vehicle interior facing surface defines seat module receiving portions with seat module connection features associated with the seat module receiving portions. A vehicle connection feature is operatively provided at a side of the vehicle body facing surface of the shell structure for cooperation with the vehicle interior connection features to fix the shell structure to the vehicle body and seat module connection features. The vehicle connection features are provided as a plurality of vehicle clamping connectors. The vehicle interior connection features each comprise vehicle support points, each supporting a vehicle connection point bar supported by the vehicle body. The method further comprises clampingly connecting the vehicle connection point bar with the vehicle clamping connector to fix the shell to the vehicle body. Seat modules are provided, each comprising a seat base and a seat clamping connector. The shell structure defines seat module receiving portions with the seat module connection features each comprising a connection point bar supported by the shell. The method further comprises clampingly connecting the clamping connector to the connection point bar to fix the seat module at one of the seat module receiving portions.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 6 is a front perspective view showing a modular seating unit being inserted into a seat module receiving portion;

FIG. 7 is a schematic partial sectional view showing connection features for the modular seating unit.

DESCRIPTION OF THE PREFERRED EMBODIMENTS

Figure 1:
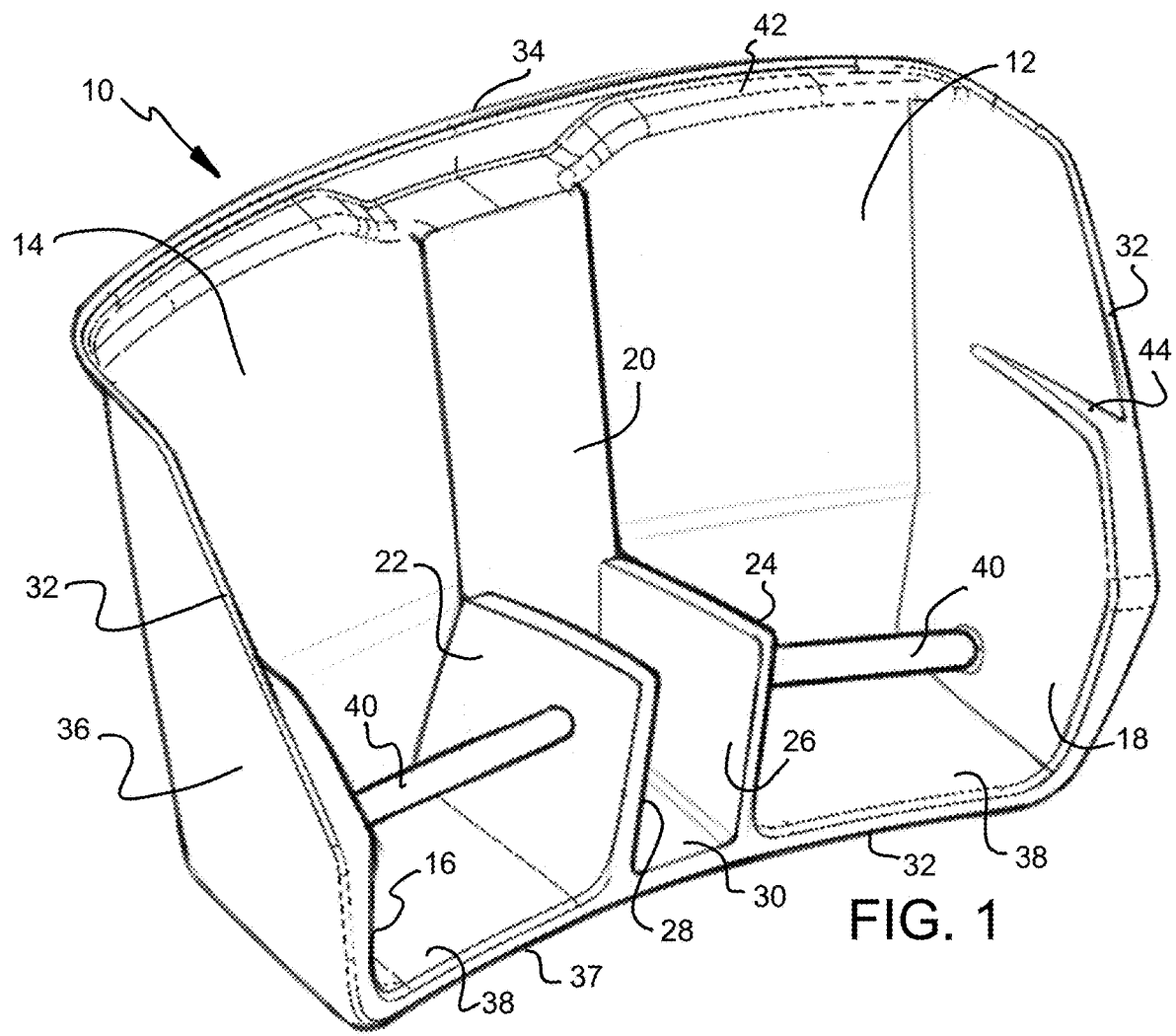
FIG. 1 is a perspective view of a modular seating shell insert according to the invention.

Referring to the drawings in particular, a modular vehicle seating insert shell generally designated 10 is preformed so as to be placed in a vehicle body, prior to seating being installed in the vehicle body. The vehicle insert shell 10 comprises a shell structure to be received within a vehicle body. The shell structure is formed of a composite such as a fiber and thermoplastic mix, carbon fiber, metal sheet and combinations of these. The shell structure may be formed of other robust material(s) allowing the insert shell 10 to have shape integrity—so as to be dimensionally stable—to be fixed within a vehicle body and to support seating components and other features as described herein. The shell insert 10 has a tub shape with interior facing surfaces which will at least partially form interior surfaces of the vehicle. The interior facing surfaces also define a left side seat module receiving portion 12 and a right side seat module receiving portion 14. The interior facing surfaces include a right side interior wall 16 and a left side interior wall 18. The side interior walls 16 and 18 will be at least partially covered by seating modules (described below) but will also form side interior surfaces of the vehicle. Although the shell insert 10 of the figures provides two seat module receiving portions 12, 14, other arrangements are possible, such as three seat module receiving portions or one bench seat receiving portion.

The disclosed embodiments, with two seat module receiving portions 12, 14, have the advantage of providing a center console region 20, which may be used for functional purposes such as storage or receiving insert components described further below. The center console region 20 comprises supporting structures in the form of center console walls including a right side wall (the direction being based on the shell insert 10 facing forward with regard to a direction of vehicle travel) and a left side wall. The right side center console wall has a right side wall surface 22 and an insert receiving space right wall surface 28. The left side center console wall has a left side wall surface 24 and an insert receiving space left wall surface 26. The side wall surfaces 22 and 24 face the respective seat module receiving portions 12 and 14. The wall surfaces 28 and 26 in cooperation with a center console insert receiving space bottom surface 30 define a lower receiving space. The lower receiving space may be provided as storage, with appropriate doors or may be provided to receive an insert component 96, discussed below. The shell insert 10 has a bottom or shell lower inner surfaces 38 which may also delimit a storage space, namely underneath a vehicle seat module 90. The insert shell 10 may have other surface features such as a contoured shell upper interior surface 42 and shell inner surface armrests 44.

Figure 4:
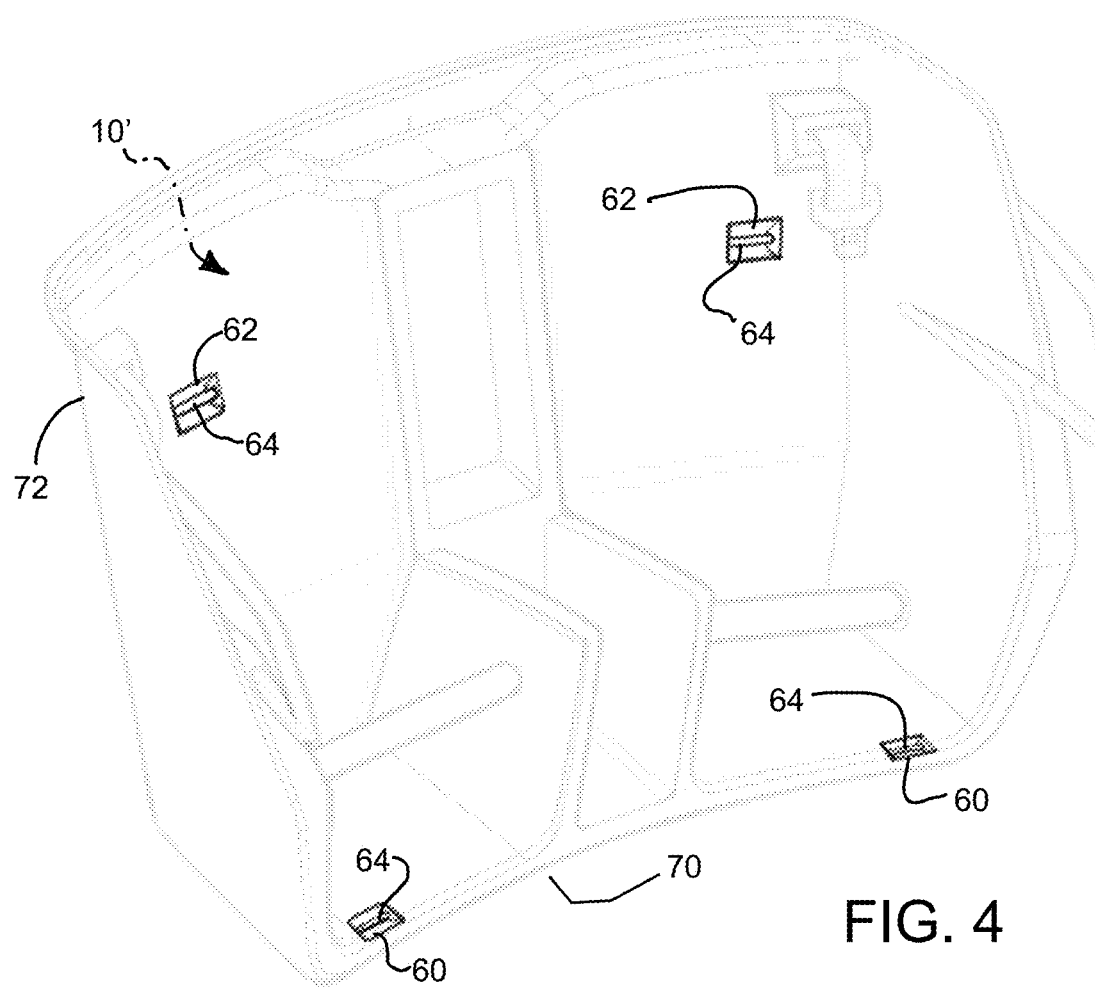
FIG. 4 is a perspective view of a vehicle floor and vehicle bulkhead/side wall, showing the shell insert of FIG. 3 as transparent (in phantom line)
Figure 5:
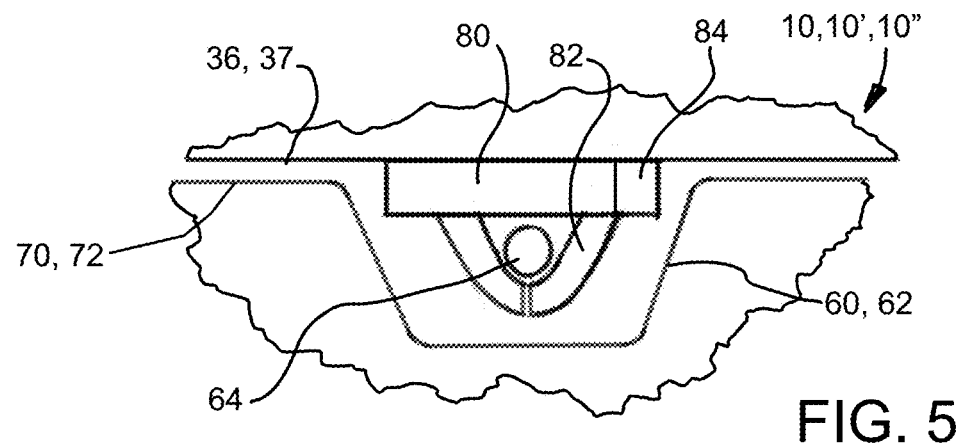
FIG. 5 is a schematic cross-sectional view showing vehicle connection features with a clamping connector for clamping connection with a connection point bar supported by the vehicle body.

The insert shell 10 is dimensionally stable with a shell forward edge 32 that extends along a base of the shell insert 10 and along each side to a shell upper edge 34. The shell insert 10 has a vehicle body facing surface 36 which extends at each side and wraps around to the rear side of the shell insert 10. The vehicle body facing surface 36 is intended to abut or face side walls and a rear wall/bulkhead 72 of the vehicle body (FIGS. 4 and 5). Shell insert 10 also has a lower surface 37 which abuts or faces a vehicle floor 70 (FIGS. 4 and 5). The dimensionally stable nature of the insert shell 10 is such that the console walls with wall surfaces 22, 28 and 24, 26 and the interior walls 16 and 18 support connection point bars 40 that form a seat module connection feature. Each of the connection point bars 40 is associated with one of the seat module receiving portions 12 and 14. Further, two or more connection point bars 40 may be provided and supported at each of the seat module receiving portions 12 and 14.

Figure 3:
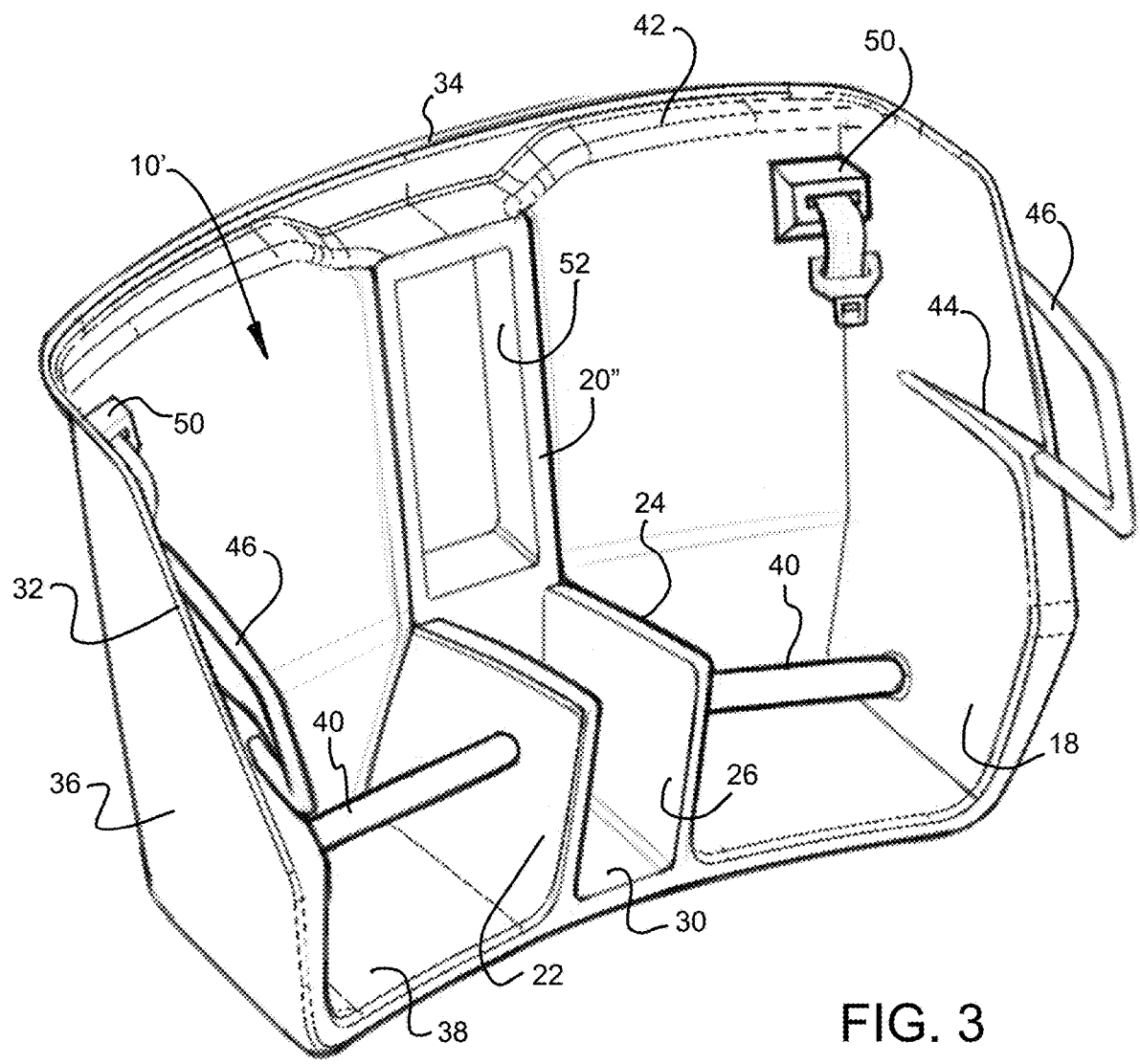
FIG. 3 is a perspective view showing another embodiment of a modular seating shell insert according to the invention.
Figure 8:
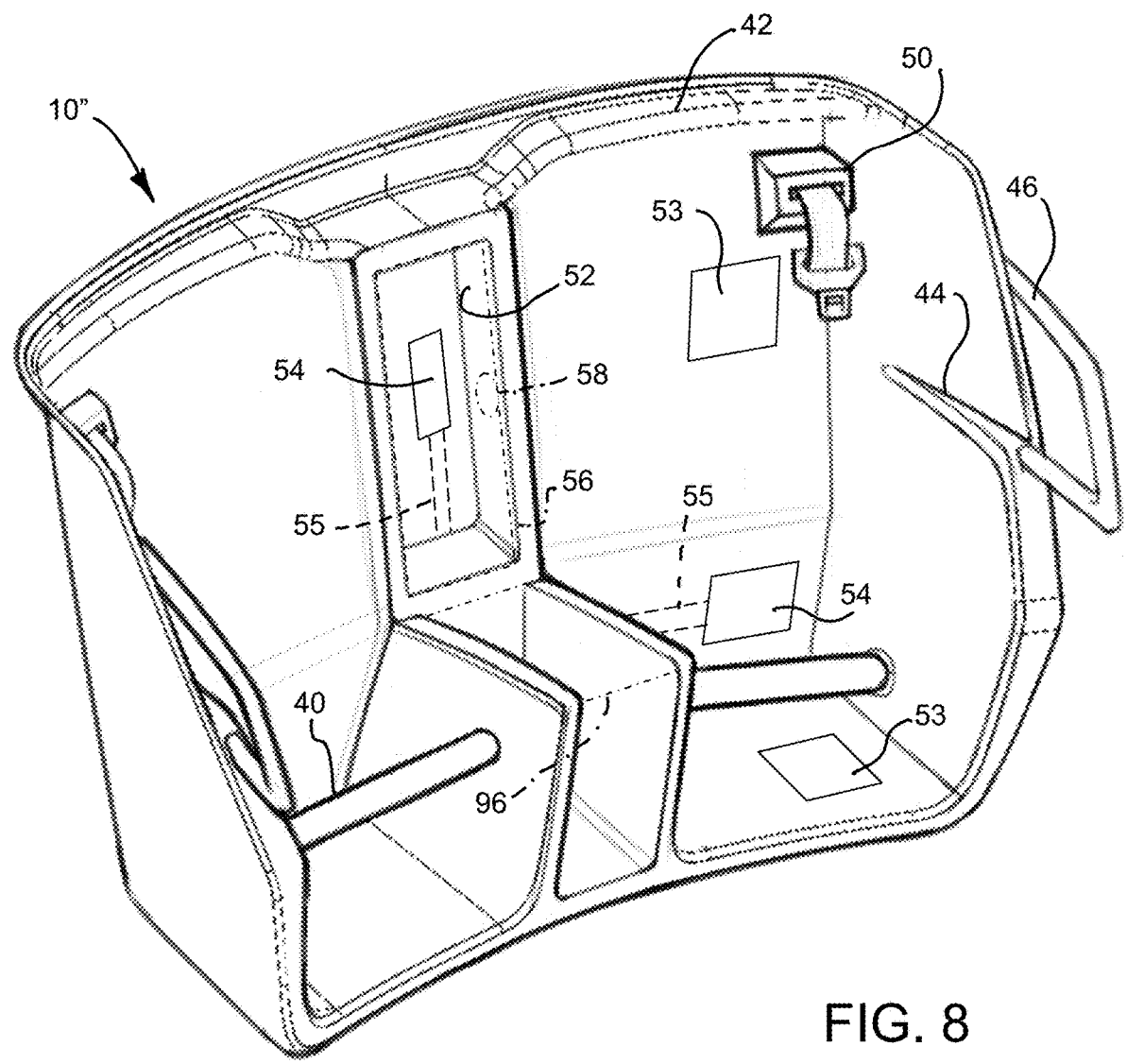
FIG. 8 is a perspective view showing another embodiment of a modular seating shell insert according to the invention.

Based on the robust and sturdy nature of the insert shell 10, other structural features may be supported by the shell insert 10. FIG. 3 shows an insert shell 10' including handle grips 46. The support connection bars 40 and the handle grips 46 may be molded in or configured and joined with the insert shell 10' during formation of the insert shell 10'. The handle grips 46 are particularly useful with a seating arrangement that provides for the insert shell 10' to face a similar insert shell 10', whereby the user of the seat opposite the handle may use the handle grips 46 to help themselves in and out of the seat and potentially also into an out of the vehicle. The handle grips 46 of FIGS. 3 and 8 show two configuration alternatives of support of an upper position of the handle grips 46. At one side the upper position is supported somewhat outwardly of the wall 18 and at another side the upper portion is supported somewhat inwardly of the wall 16. However, preferably in each case the upper portion is supported by the respective wall and may advantageously be molded into the wall and be essentially in the respective wall.

Figure 2:
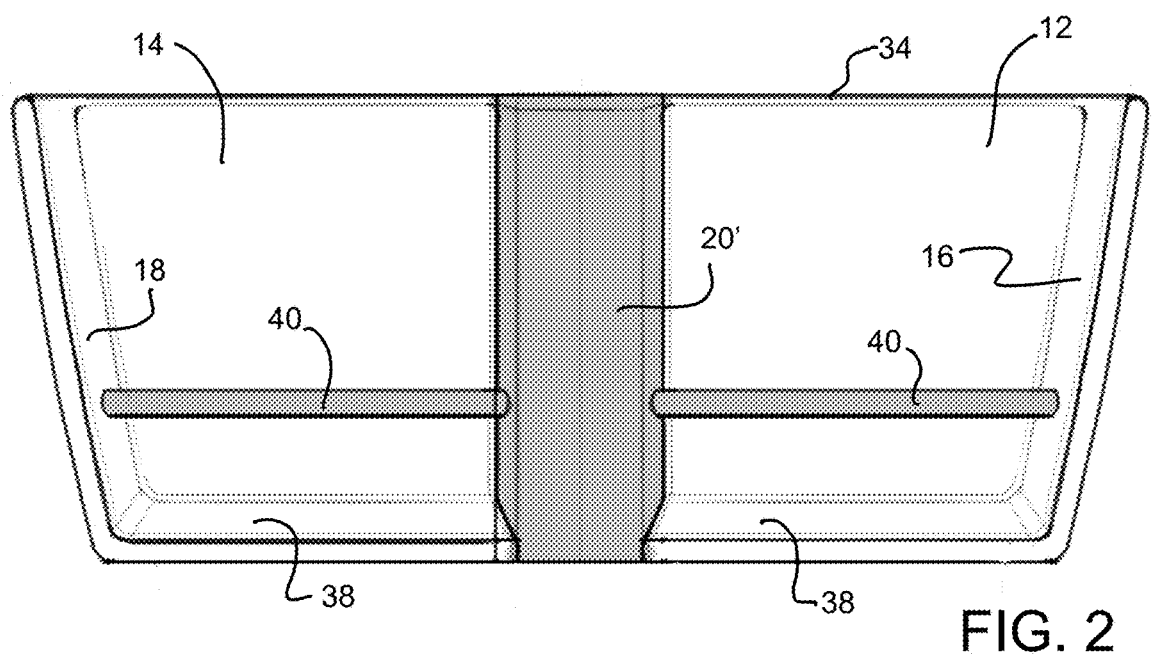
FIG. 2 is a front perspective view of a slightly modified shell insert according to the invention.

FIG. 2 shows a slightly modified version of the insert shell 10 wherein the center console 20' differs from the center counsel 20 previously described. The center console 20' forms a divider between seating regions defined by the left side seat module receiving portion 12 and a right side seat module receiving portion 14. The entire center console 20' may be used to provide storage space or a space for receiving one or more insert component.

FIG. 3 shows a center console region 20" that defines a center console storage space 52. The storage space 52 may include features such as shelves or hooks for supporting coats and the like. Additionally, a door may be provided to close the storage space 52. The modified insert shell 10' advantageously incorporates other additional features besides handles and storage features. For example, safety features may be provided including compartments holding airbags, which compartments are covered by suitable coverings allowing the airbags to the hidden and protected during non-use. The embodiment of FIG. 3 further includes a seat belt retractor assembly 50. The seat belt retractor assembly 50 is fixed to the shell insert 10'. The retractor assembly 50 may be molded into the insert shell 10' or otherwise fixed to the shell insert 10' during the manufacturing of the insert shell 10'. In addition, a seat belt anchor may be fixed to the shell insert 10' or both a seat belt retractor assembly 50 is fixed to the shell insert 10' and a seat belt anchor is fixed to the shell insert 10'. Such a seat belt anchor may be connected to a strap portion which is in turn connected to a buckle clasp (not shown). Numerous other additional features may be partially formed in the insert shell 10' or may be fixed during manufacturing of the insert shell 10' or may be fixed to the insert shell 10" before or after the insert 10' is placed into the vehicle body.

FIG. 4 shows the vehicle floor surface 70 and a vehicle wall surface (or bulkhead surface) 72 which are configured with vehicle interior connection features 60, 64 and 62, 64 to fix the shell structure to the vehicle body. The shell insert includes vehicle connection features 80, 82 and 84 which are operatively provided at a side of the vehicle body facing surface of the shell structure 10, 10' or 10" (described further below) for cooperation with the vehicle interior connection features 60, 64 and 62, 64 to fix the shell structure to the vehicle body. In FIG. 4 the insert shell 10' is shown as transparent, so as to see the position of the shell 10' relative to the floor surface 70 and the wall surface 72.

The shell insert 10, 10' or 10" is preferably provided as a prefabricated module with essentially all features present at the time it is inserted into the vehicle body. The vehicle body is preferably provided with at least one door opening of sufficient size to receive the shell insert 10, 10' and 10". For example, the vehicle may be intended to be a taxi or multiple passenger carrying vehicle with relatively large door openings through which the shell insert 10, 10' and 10" can pass. In the alternative, the shell insert 10, 10' and 10" may be dropped into a portion of a vehicle body prior to fully forming the vehicle body. In the disclosed embodiments the vehicle body has an interior floor surface 70 which includes a vehicle floor connection feature recess 60. The vehicle body preferably also includes a vehicle wall surface or bulkhead surface 72 with vehicle bulkhead/wall connection feature recess 62. The vehicle body including the floor at the vehicle floor surface 70 and the wall at the wall surface 72 supports a connection point bar 64 at each of the recesses 60 and 62.

The shell insert 10, 10' and 10" includes a plurality of clamping connector mechanisms 80, each with clamping claws 82. FIG. 5 shows the interaction of one such clamping connector mechanism 80, including clamping claws 82, and the connection point bar 64, which is supported and held by the vehicle body. The mechanism 80 includes an actuating feature (engagement actuator(s)) such that upon placement of the shell insert 10, 10' and 10" in position relative to the floor surface 70 and the wall surface 72, the connection point bar 64 actuates a clamping, with the clamping claws 82 engaging around the connection point bar 64. In the alternative, the shell insert 10, 10' and 10" may be positioned relative to the floor surface 70 in the wall surface 72 and each of the clamping connector mechanisms 80 is actuated individually, with actuator 84, via access openings 53 discussed below. The clamping connection that is provided fixes the shell insert 10, 10' and 10" in position within the vehicle body and prevents movement of the shell insert 10, 10' and 10" relative to the floor surface 70 and relative to the wall surface 72. The clamping connector mechanisms 80 may include the actuator 84 which only clampingly connects the shell insert 10, 10' and 10" to the vehicle body or, in the alternative, the actuator 84 may be provided that is configured to also release the clamping connection of the shell insert 10, 10' and 10" to the vehicle body. The engagement actuator, the disengagement actuator and/or the engagement actuator and disengagement actuator 84 may be provided at each mechanism 80 or may be a single actuator 84 connected to each mechanism 80.

The shell insert 10, 10' and 10", positioned and fixed within the vehicle body, receives a modular vehicle seating insert 90 in each of the seat module receiving portions 12 and 14. To provide for the connection and/or the connection and disconnection of the modular vehicle seating insert 90, a seating insert clamping connector mechanism 92 is provided that is connected to an underside of the seat base (cushion) 94 of the modular vehicle seating insert 90 (FIG. 7). The seating insert clamping connector mechanism 92 includes clamping claws 91 which clampingly connect the modular vehicle seating insert 90 to the connection point bar 40. As an alternative, plural connection point bars 40 may be provided at each receiving portion 12, 14 and plural connector mechanisms 92 may be provided at each seating insert 90. The seating insert clamping connector mechanism 92 may advantageously include a clamping actuator 93 to actuate the clamping mechanism 92 for fixing the modular vehicle seating insert 90 to the connection point bar 40 and releasing the modular vehicle seating insert 90 from the connection point bar 40.

The actuation may be automatic, with the actuation of the clamping mechanism to have the clamping claws 91 engage the connection point bar 40 as the modular vehicle seating insert 90 is moved in seating module insertion direction 95, to lock and fix the modular vehicle seating insert 90 to the connection point bar 40 (FIG. 6). The actuation via the clamping actuator 93 may be manually initiated. In each case this results in a fixing of the modular vehicle seating insert 90 to the shell insert 10, 10' and 10". The clamping actuator 93 of the seating insert clamping connector mechanism 92 may further allow for a disconnection based on the actuator 93 actuating the clamping mechanism 92 to release the clamping claws 91 of the clamping mechanism 92. By allowing both the connection with a fixing a subsequent disconnection a modular vehicle seating insert 90 may be swapped out for a different or new modular vehicle seating insert 90. A particular advantage of the shell insert 10, 10' and 10" the ability to change out the particular modular vehicle seating insert 90 for another particular modular vehicle seating insert 90. This allows, among other things, the ability to change a configuration of the interior seating space of a vehicle and also allows the old seating inserts 90 to be swapped out for new seating inserts 90, e.g., after significant wear, to the original modular vehicle seating insert 90. The arrangement is believed to be particularly useful with autonomous vehicles that are taxis and/or standard vehicles, particularly taxis and vehicles carrying multiple passengers.

FIG. 8 shows a further embodiment of a shell insert 10". The shell insert 10" is essentially the same as the shell insert 10', except that shell insert 10" includes a center console region 20" with the space storage space 52 that is covered by a storage space cover door 56. The door 56 may be as simple hinge door with an actuator 58 which allows for controlled opening and potential locked closing of the door 56. The door 56 may also be comprised of slats and mounted on a roller for being deployed and retracted (garage door type). In addition, the shell insert 10" includes one or more access passages 53 which provide access to an engagement/disengagement actuator 84 of the clamping mechanism 80, allowing the engagement/disengagement actuator to be used to control a connection and/or a disconnection of the shell insert 10" to the vehicle body. The shell insert 10" may include other access passages 54, that allow access to a region behind the shell insert 10". The shell insert 10" also includes one or more distribution paths (channels) 55, either formed as a tubular distribution path between the interior facing surface of the shell 10" and the rear side surface facing walls of the vehicle body or the rear side surface facing the walls of the vehicle body may form a trough or channel. The distribution paths 55 are particularly useful for bringing power and/or a data connection to a location of the interior facing side of the shell insert 10".

In FIG. 8, reference number 55 also designates power/data lines including power attachments comprising a connector end disposed adjacent to or extending out of the access passage and wires extending through the distribution path. For example, one distribution path 55 may bring power and control signals to the access passage 54 at or below the seat module receiving portion to power and control motors associated with the modular vehicle seating insert 90. This can allow for a motorized adjustment of the position of the seating insert 90. The distribution path 55 which connects to the access passage 54 within the storage space 52 may be used for supplying ac power or a similar functional connection. Similar distribution path 55 and access passage 54 may be provided to supply a data or power connection to an insert component 96 positioned in the insert component receiving space of the center console. Data lines and/or power lines are advantageously routed as desired along and/or through the shell insert 10" such that one or more insert components may be located as desired to provide a number of features. The functionality of the provided insert components 96 includes one or more of: a credit/debit card reader; an ac power connection; an inductive power charge facility; a data connector; a wireless data transceiver; a video display; an optical reader; a fold out tray device; and a mobile device support. Further, any of the spaces defined by the shell insert 10" may be used for storage or instead may receive such an insert component 96. Further the door 56 as a closing door of a space and/or as a cover door of another insert component 96 has a surface including a touchscreen actuator or a physical button actuator 58 which changes the display, such as a display comprising a graphical user interface (GUI), allowing a passenger to interact with other features. The embodiment of FIG. 8, the door 56 is itself is a part of an insert component 96 and provides a touchscreen with one or more soft keys and/or actual button actuators 58. The soft keys and/or actual button actuators 58 provide actuation input of the user, which may trigger a signal providing input. The input may change information content on the touchscreen and provide a physical change, such as unlocking the storage door 56.

According to another aspect of the invention a vehicle seating method is provided which includes providing, namely forming, an insert shell 10, 10' or 10". As noted, the insert shell 10, 10' or 10" may be a plastic/fiber molded structure. Some features, such as the handle 46 and the connection point bar 40, are advantageously molded in during the formation process. Other materials may be used to form the insert shell 10, 10' or 10" including a metal such as sheet-metal, carbon fiber and various combinations of metal, plastics and fibers.

A vehicle body is provided with an opening sufficiently large enough for the insert shell 10, 10' or 10" to pass through the opening. If the vehicle is a taxi or similar vehicle, sliding doors, gull wing doors or a set of same vehicle side doors with opposite hinges (forward door with suicide door hinge and rearward door with standard opening door in combination as a set), may present an opening size which is more than sufficient for the passage of an insert shell 10, 10' or 10". This vehicle body is further provided with vehicle interior connection features 60, 62, 64, as described above. The vehicle insert shell 10, 10' or 10" is provided with the vehicle connection features, each comprising a vehicle clamping connector mechanism 80 with engageable clamping claws 82, as described above. Preferably the vehicle interior connection features each comprise vehicle support points, each supporting a vehicle connection point bar 64 supported by the vehicle body, as described above. However, the features may be switched with the insert shell 10, 10' or 10" having the connection point bars 64 and the floor recess 62 and the wall or vehicle body frame recesses 62 supporting the clamping connector mechanism 80 with engageable clamping claws 82. The insert shell 10, 10' or 10" is inserted within the vehicle body. If multiple insert shells 10, 10' or 10" are provided, each insert shell 10, 10' or 10" is inserted into the insert body, one at a time. The insert shell 10, 10' or 10" is fixed to the vehicle body by clampingly connecting the vehicle connection point bar with the vehicle clamping connector to fix the shell to the vehicle body.

The method further includes providing a seat module 90 comprising a seat base and a seat clamping connector mechanism 92 as described above. The shell 10, 10' or 10" defines preferably two or more seat module receiving portions 12 and 14. Each provided seat module 90 includes connection features that comprise a connection point bar 40 supported by the shell insert 10, 10' or 10". In the alternative, the seat module 90 has one or more connection point bars that are engaged by one or more clamping connector mechanisms 92 supported by the shell insert 10, 10' or 10". Preferably subsequent to the fixing of the one or more insert shell 10, 10' or 10", each seat module 90 is clampingly connected to the shell insert 10, 10' or 10" by connecting the clamping claws of the seating insert clamping connector mechanism 92 to the connection point bar(s) 40 to fix the seat module 40 at one of the seat module receiving portions 12, 14 of the shell insert 10, 10' or 10".

While specific embodiments of the invention have been shown and described in detail to illustrate the application of the principles of the invention, it will be understood that the invention may be embodied otherwise without departing from such principles.

APPENDIX

LIST OF REFERENCE CHARACTERS

| | |
|---|---|
| 10 | modular vehicle seating insert |
| 10' | modular vehicle seating insert |
| 10" | modular vehicle seating insert |
| 12 | left side seat module receiving portion |
| 14 | right side seat module receiving portion |
| 16 | right side interior wall |
| 18 | left side interior wall |
| 20 | center console region |
| 20' | center console region |
| 20" | center console region |
| 22 | center console region right side wall |
| 24 | center console region left side wall |
| 26 | center console insert receiving space left side wall |
| 28 | center console insert receiving space right side wall |
| 30 | center console insert receiving space bottom surface |
| 32 | shell forward upper edge |
| 34 | shell upper edge |
| 36 | shell outer surface |
| 38 | shell lower inner surface |
| 40 | connection point bar - seat module connection features |
| 42 | shell upper interior surface |
| 44 | shell inner surface armrest |
| 46 | handle grip |
| 50 | seat belt retractor assembly |
| 52 | center console storage space |
| 53 | access passage for vehicle connection feature - clamping connector disconnect/connect |
| 54 | access passage |
| 55 | distribution path |
| 56 | storage space cover/door |
| 58 | actuator |
| 60 | vehicle floor connection feature recess |
| 62 | vehicle bulkhead/wall connection feature recess |
| 64 | connection point bar |
| 70 | vehicle floor |
| 72 | vehicle bulkhead/wall |
| 80 | clamping connector mechanism |
| 82 | clamping clause |
| 84 | connection mechanism actuator |
| 90 | modular vehicle seating insert |
| 91 | clamping claws |
| 92 | seating insert clamping connector mechanism |
| 93 | clamping mechanism actuator |
| 94 | seat base (cushion) |
| 95 | seating module insertion direction |
| 96 | insert component |
| 97 | headrest |
| 98 | seat back (backrest) |

What is claimed is:

1. A modular vehicle seating insert comprising:
an insert shell structure to be received within a vehicle body and having a vehicle body facing surface and a vehicle interior facing surface, wherein the vehicle interior facing surface defines seat module receiving portions;
vehicle connection features operatively provided at a side of the vehicle body facing surface of the shell structure for cooperation with vehicle body connection features to fix the shell structure to the vehicle body; and
seat module connection features, each of the seat module connection features being associated with one of the seat module receiving portions;
wherein the vehicle connection features each comprise a clamping connector for clamping connection with a connection point bar supported by the vehicle body.

2. A modular vehicle seating insert according to claim 1, wherein:
the shell defines a central portion separating the seat module receiving portions;
the seat module connection features each comprise a connection point bar extending from a shell sidewall to the central portion.

3. A modular vehicle seating insert according to claim 2, wherein the shell supports a handle grip, extending outwardly from the shell structure and positioned at a side of each of the seat module receiving portions.

4. A modular vehicle seating insert according to claim 2, further comprising a seat belt retractor assembly fixed to the shell or a seat belt anchor fixed to the shell or both a seat belt retractor assembly fixed to the shell and a seat belt anchor fixed to the shell.

5. A modular vehicle seating insert according to claim 2, wherein the shell comprises a passage:
providing an access passage between a vehicle body facing surface side and a vehicle interior facing surface side; or
providing a distribution path along an extent of the shell; or
providing an access passage between a vehicle body facing surface side and a vehicle interior facing surface side and providing a distribution path along an extent of the shell.

6. A modular vehicle seating insert according to claim 5, further comprising power attachments comprising a connector end disposed adjacent to or extending out of the access passage and wires extending through the distribution path.

7. A modular vehicle seating insert according to claim 2, wherein the insert shell structure comprises a storage space defined by a portion of the vehicle body facing surface.

8. A modular vehicle seating system comprising:
a vehicle body with vehicle interior connection features; and
a modular vehicle seating insert comprising:
a shell structure to be received within the vehicle body, the shell structure having a vehicle body facing surface and a vehicle interior facing surface, wherein the vehicle interior facing surface defines seat module receiving portions;
vehicle connection features operatively provided at a side of the vehicle body facing surface of the shell structure for cooperation with the vehicle interior connection features to fix the shell structure to the vehicle body; and
seat module connection features, each of the seat module connection features being associated with one of the seat module receiving portions;
wherein the vehicle connection features each comprise a vehicle clamping connector for clamping connection with a vehicle connection point bar supported by the vehicle body.

9. A modular vehicle seating system according to claim 8, wherein:
the vehicle interior connection features comprise vehicle support points each supporting a vehicle connection point bar; and
the vehicle clamping connector clampingly connects with the vehicle connection point bar to fix the shell to the vehicle body.

10. A modular vehicle seating system according to claim 9, further comprising a seat module comprising a seat base and a seat clamping connector, wherein:
the seat module connection features each comprise a connection point bar supported by the shell and provided at each of the seat module receiving portions;

the seat clamping connector clampingly connects with the connection point bar to fix the seat module at one of the seat module receiving portions.

11. A modular vehicle seating system according to claim 10, wherein the shell supports a handle grip, extending outwardly from the shell and positioned at each side of the seat module receiving portions.

12. A modular vehicle seating system according to claim 10, further comprising a seat belt retractor assembly fixed to the shell or a seat belt anchor fixed to the shell or both a seat belt retractor assembly fixed to the shell and a seat belt anchor fixed to the shell.

13. A modular vehicle seating system according to claim 10, wherein the shell comprises a passage:
   providing an access passage between a vehicle body facing surface side and a vehicle interior facing surface side; or
   providing a distribution path along an extent of the shell; or
   providing an access passage between a vehicle body facing surface side and a vehicle interior facing surface side and providing a distribution path along an extent of the shell.

14. A modular vehicle seating system according to claim 13, further comprising transmission path attachments comprising a connector end disposed adjacent to or extending out of the access passage and wires extending through the distribution path.

15. A modular vehicle seating system according to claim 14, further comprising an insert component wherein:
   the shell defines an insert component receiving space defined by a portion of the vehicle body facing surface; and
   the insert component is connected to power and vehicle system features via the connector and wires.

16. A modular vehicle seating system according to claim 15, wherein the insert component is at least one component selected from the group comprising:
   a credit/debit card reader;
   an ac power connection;
   an inductive power charge facility;
   a data connector;
   a wireless data transceiver;
   a video display;
   an optical reader;
   a fold out tray device; and
   a mobile device support.

17. A modular vehicle seating system according to claim 13, wherein the shell further comprises a storage space defined by a portion of the vehicle body facing surface.

18. A modular vehicle seating method comprising the steps of:
   providing a vehicle body with vehicle interior connection features;
   providing a modular vehicle seating insert comprising a shell structure to be received within a vehicle body and having a vehicle body facing surface and a vehicle interior facing surface, wherein the vehicle interior facing surface defines seat module receiving portions, and a vehicle connection feature operatively provided at a side of the vehicle body facing surface of the shell structure for cooperation with the vehicle interior connection features to fix the shell structure to the vehicle body and seat module connection features, each of the seat module connection features being associated with one of the seat module receiving portions;
   providing the vehicle connection features to each comprise a vehicle clamping connector;
   providing the vehicle interior connection features to each comprise vehicle support points each supporting a vehicle connection point bar supported by the vehicle body;
   clampingly connecting the vehicle connection point bar with the vehicle clamping connector to fix the shell to the vehicle body;
   providing a seat module comprising a seat base and a seat clamping connector;
   providing the shell so as to define seat module receiving portions;
   providing the seat module connection features to each comprise a connection point bar supported by the shell; and
   clamping connecting the clampingly connector to the connection point bar to fix the seat module at one of the seat module receiving portions.

19. A method according to claim 18, wherein:
   the shell comprises a passage: providing an access passage between a vehicle body facing surface side and a vehicle interior facing surface side; or providing a distribution path along an extent of the shell; or providing an access passage between a vehicle body facing surface side and a vehicle interior facing surface side and providing a distribution path along an extent of the shell;
   transmission path attachments are provided comprising a connector end disposed adjacent to or extending out of the access passage and wires extending through the distribution path;
   the shell defines an insert component receiving space defined by a portion of the vehicle body facing surface; and
   an insert component is disposed in the insert component receiving space and is connected to power and vehicle system features via the connector and wires.

* * * * *